(12) United States Patent
Gabe et al.

(10) Patent No.: US 7,716,918 B2
(45) Date of Patent: May 18, 2010

(54) METHOD OF EXHAUST GAS PURIFICATION AND EXHAUST GAS PURIFICATION SYSTEM

(75) Inventors: Masashi Gabe, Fujisawa (JP); Daiji Nagaoka, Fujisawa (JP)

(73) Assignee: Isuzu Motors Limited, Tokyo (JP)

( * ) Notice: Subject to any disclaimer, the term of this patent is extended or adjusted under 35 U.S.C. 154(b) by 332 days.

(21) Appl. No.: 11/660,312

(22) PCT Filed: Jul. 26, 2005

(86) PCT No.: PCT/JP2005/013626

§ 371 (c)(1),
(2), (4) Date: Feb. 15, 2007

(87) PCT Pub. No.: WO2006/027903

PCT Pub. Date: Mar. 16, 2006

(65) Prior Publication Data

US 2007/0256405 A1 Nov. 8, 2007

(30) Foreign Application Priority Data

Sep. 3, 2004 (JP) ............................. 2004-256597

(51) Int. Cl.
*F01N 3/00* (2006.01)
(52) U.S. Cl. .............................. 60/286; 60/295; 60/297; 60/303
(58) Field of Classification Search .................. 60/274, 60/285, 286, 295, 297, 278, 280, 303
See application file for complete search history.

(56) References Cited

U.S. PATENT DOCUMENTS 5,471,836 A * 12/1995 Takeshima et al. ............ 60/297

(Continued)

FOREIGN PATENT DOCUMENTS

EP 1 384 866 1/2004

(Continued)

OTHER PUBLICATIONS

International Search Report mailed Nov. 8, 2005 for International Application PCT/JP2005/013626 (1 pg).

(Continued)

*Primary Examiner*—Binh Q. Tran
(74) *Attorney, Agent, or Firm*—Staas & Halsey LLP

(57) ABSTRACT

In an exhaust gas purification system, including a catalyst unit carrying an NOx occlusion-reduction type catalyst, a first-stage rich control having a target air-fuel ratio lower than theoretical air-fuel ratio and which is conducted through addition of an amount of a reducing agent meeting an amount of oxygen emitted in the initial stage of regeneration control. In the first-stage rich control a completion of oxygen emission is judged on the basis of an oxygen concentration on the downstream side of the catalyst unit. Upon determination of the completion of the oxygen emission, a later-stage rich control close to the theoretical air-fuel ratio with the target air-fuel ratio increased over that of the first-stage rich control is conducted to thereby accomplish regeneration of the catalyst unit. As a result, there can be prevented not only any outflow of unpurified NOx occurring in the initial stage of regeneration but also any outflow of virgin reducing agents, such as HC and CO, occurring in the later stage of regeneration.

10 Claims, 9 Drawing Sheets

U.S. PATENT DOCUMENTS

| | | | |
|---|---|---|---|
| 6,233,925 B1 * | 5/2001 | Hirota et al. | 60/285 |
| 6,460,329 B2 * | 10/2002 | Shimotani et al. | 60/285 |
| 6,487,853 B1 * | 12/2002 | Hepburn et al. | 60/295 |
| 6,860,101 B2 * | 3/2005 | Kako et al. | 60/285 |
| 7,246,486 B2 * | 7/2007 | Nakagawa et al. | 60/285 |

FOREIGN PATENT DOCUMENTS

| | | |
|---|---|---|
| JP | 6-336916 | 12/1994 |
| JP | 11-210524 | 8/1999 |
| JP | 11-347369 | 12/1999 |
| JP | 2000-27677 | 1/2000 |
| JP | 2000-213339 | 8/2000 |
| JP | 2002-188430 | 7/2002 |
| JP | 2002-309928 | 10/2002 |
| JP | 2004-232555 | 8/2004 |

OTHER PUBLICATIONS

Patent Abstracts of Japan, Publication No. 06-336916, Published Dec. 6, 1994.

Patent Abstracts of Japan, Publication No. 2000-27677, Published Jan. 25, 2000.

Patent Abstracts of Japan, Publication No. 2002-188430, Published Jul. 5, 2002.

Extended European Search Report dated Feb. 10, 2010 in EPC application No. 05767190.1.

* cited by examiner

Lean air/fuel ratio condition (occlusion of NOx)

Rich air/fuel ratio condition (release and reduction of NOx)

METHOD OF EXHAUST GAS PURIFICATION AND EXHAUST GAS PURIFICATION SYSTEM

CROSS REFERENCE TO RELATED APPLICATIONS

This application claims the benefit under 35 U.S.C. Section 371, of PCT International Application No. PCT/JP2005/013626, filed Jul. 26, 2005 and Japanese Application No. 2004-256597, filed Sep. 3, 2004 in Japan, the contents of which are incorporated herein by reference.

BACKGROUND OF THE INVENTION

1. Field of the Invention

The present invention relates to a method of exhaust gas purification and an exhaust gas purification system having a catalyst unit carrying a NOx (nitrogen oxides) occlusion-reduction type catalyst that reduces and purifies NOx in exhaust gas from internal combustion engines.

2. Description of the Related Art

Various research and proposals have been made regarding NOx (nitrogen oxides) catalysts to reduce and remove NOx in exhaust gas from internal combustion engines such as diesel engines and certain types of gasoline engines and various combustion units. One of such catalysts is a NOx occlusion-reduction type catalyst, which is a catalyst for decreasing NOx from diesel engines. By using a catalyst unit carrying the NOx occlusion-reduction type catalyst, NOx in exhaust gas can be purified effectively.

This catalyst unit is constructed, having a monolith honeycomb 30M whose structure is as shown in FIG. 7. The monolith-honeycomb 30M, as shown in FIG. 8, is constructed by forming multiple of polygonal cells 30S on a support 31 that is a structural material made of cordierite or stainless steel. On the walls of the cells 30S, as shown in FIGS. 8 and 9, a porous catalyst coat layer 34, which is a catalyst carrying layer, made of alumina ($Al_2O_3$) or zeolite is provided. The catalyst coat layer 34 increases the contact surface area with exhaust gas. On the surface of the catalyst coat layer 34, there are carried precious metal (catalytically active metal) 32 and NOx occlusion material (NOx occlusion substance: NOx occlusion agent; NOx absorbent) 33. A catalytic function is provided by the construction described above.

FIGS. 10 and 11 show the configuration and occlusion-reduction mechanism of catalytic substances 32 and 33 on the surface of the carrying layer of the catalyst unit. In the catalyst unit, precious metal 32 having an oxidation function and NOx occlusion material 33 having a NOx occlusion function, are carried on the catalyst coat layer 34. The precious metal 32 is platinum (Pt) or the like. The NOx occlusion material 33 is made of some of alkaline metals such as potassium (K), sodium (Na), lithium (Li) and cesium (Cs), alkaline earth metals such as barium (Ba) and calcium (Ca) and rare-earth metals such as lanthanum (La) and yttrium (Y). Depending on the oxygen concentration in exhaust gas, the catalyst unit having the above described construction will perform the function of NOx occlusion or NOx release with purification of the released NOx.

As shown in FIG. 10, in normal diesel engines, lean-burn gasoline engines and the like, the exhaust gas contains oxygen ($O_2$). In such cases where the air/fuel ratio of exhaust gas is in a lean air/fuel condition, nitrogen monoxide (NO) emitted from engines is oxidized into nitrogen dioxide ($NO_2$) with oxygen contained in exhaust gas by the oxidation catalytic function of precious metal 32. Then, the nitrogen dioxide is occluded in the form of nitrate to the NOx occlusion material 33 such as barium having a NOx occlusion function, thus purifying NOx.

However, if the above reaction continues, the entire portion of the NOx occlusion material 33 having a NOx occlusion function will turn into nitrate, and will therefore lose the NOx occlusion function eventually. Therefore, exhaust gas with high fuel concentration (rich spike gas) is generated by changing the operating conditions of an engine or by injecting fuel into an exhaust passage, and then fed into the catalyst. The rich spike gas has no oxygen and a high carbon monoxide (CO) concentration with a high temperature.

Then, as shown in FIG. 11, in the rich air/fuel condition where there is no oxygen and a high concentration of carbon monoxide with a raised exhaust gas temperature, the nitrate formed after occluding NOx, releases nitrogen dioxide and returns to the original barium and the like. The released nitrogen dioxide, since no oxygen exists in the exhaust gas, is reduced by the oxidation function of carried precious metal 32, thus purifying the exhaust gas. That is, nitrogen dioxide is reduced into water ($H_2O$), carbon dioxide ($CO_2$) and nitrogen ($N_2$) by using carbon monoxide, carbon hydride (HC) and hydrogen ($H_2$) that are reductants in exhaust gas.

For the purpose described above, in an exhaust gas purification system having a catalyst unit carrying a NOx occlusion-reduction type catalyst, as described in Japanese Patent Application Kokai Publication No. 1994-336916, for example, the following regeneration operation is performed. When an estimated NOx occlusion amount reaches a NOx saturation amount, the air/fuel ratio in exhaust gas is made rich, thus decreasing the oxygen concentration in inflowing exhaust gas. That is, a rich control is performed for restoring a NOx occlusion capacity. The rich control causes occluded NOx to be released and the released NOx to be reduced with a precious metal catalyst.

However, in the conventional rich combustion control for regenerating the NOx occlusion capacity of the catalyst unit carrying a NOx occlusion-reduction type catalyst, the rich control is performed at the excess air ratio $\lambda$ of 1.0 i.e. at the theoretical air/fuel ratio in the initial stage of rich combustion as shown in FIG. 12. At the beginning, the oxygen adsorbed onto the surface of the catalyst is released. The released oxygen consumes reductant in exhaust gas. Therefore, sufficient amount of reductant does not remain to reduce released NOx, so that the NOx reduction reaction is insufficiently activated. As a result, the NOx concentration at a catalyst outlet Cnoxex is remarkably higher compared to the NOx concentration at a catalyst inlet Cnoxin, and a large amount of unpurified NOx is released into the downstream of the catalyst unit. That is, the air/fuel ratio adjacent to the catalyst surface does not become rich because of the oxygen adsorbed on the catalyst surface. Therefore, NOx cannot be reduced and flows out. As a result, there is a problem that the overall performance of NOx purification is degraded.

In addition, in this regeneration control of the catalyst unit, the release of oxygen adsorbed onto the catalyst surface occurs more easily, compared to the release of NOx due to the decomposition of nitrate. As a result, in the initial stage of the regeneration control, NOx remain in a NOx occlusion agent at a high degree. This causes a problem that the restoration of a NOx occlusion capacity becomes insufficient, unless the regeneration control time is set, taking the above described issue into consideration.

In order to solve the problem, there is considered making the exhaust gas more fuel-rich. That can be attained by measuring the amount of oxygen adsorbed onto the catalyst unit in an experiment in advance and increasing the amount of reductant corresponding to the amount of oxygen released from the adsorbed oxygen.

An example close to this consideration is proposed in Japanese Patent Application Kokai Publication No. 2000-27677, which is an exhaust gas purification unit for a lean-burn internal combustion engine. In this exhaust gas purification unit, a catalyst unit having an oxygen ($O_2$) storage function is placed in the upstream of a catalyst unit carrying a NOx occlusion-reduction type catalyst. The catalyst unit in the upstream works as a catalyst unit for startup time and its main purpose is to remove HC and CO components that are released in large amounts from an engine at startup. In this exhaust gas purification unit, the catalyst unit for startup time releases oxygen during a rich spike operation for regenerating the catalyst unit carrying a NOx occlusion-reduction type catalyst. By releasing oxygen, it is intended to solve the problem that unpurified NOx are flowed out toward the downstream of the catalyst unit in the initial stage of the regeneration.

This exhaust gas purification unit comprises a means for decreasing storage that makes an air/fuel ratio even richer than that during the rich spike operation for regenerating a NOx occlusion-reduction type catalyst by adding reductant to consume the entire amount of oxygen released from the catalyst unit in the upstream for startup time. The means for decreasing storage prevents the air/fuel ratio adjacent to a NOx occlusion-reduction type catalyst from becoming less rich than the theoretical air/fuel ratio in the initial stage of the rich spike operation, thus preventing NOx from being unpurified.

However, if the regeneration control of increasing the amount of reductant corresponding to the amount of released oxygen is employed, NOx continue to be released even after the completion of oxygen release. Because of this, the amounts of HC and CO that are reductant in exhaust gas become excessive, after oxygen that has been absorbed by an oxygen storage function, is released from the surface of a catalyst. As a result, there arises a problem that the exhaust gas is extremely deteriorated since HC and CO that have not been used for the reduction of NOx are flowed out in unpurified state toward the downstream of the catalyst unit carrying a NOx occlusion-reduction type catalyst.

That is, as shown in FIG. 13, when the more fuel-rich control whose excess air ratio λ is smaller than 1.0, i.e. whose air/fuel ratio is smaller than the theoretical air/fuel ratio is performed, the NOx concentration at a catalyst outlet Cnoxex in the initial stage becomes lower. However, the HC concentration at the catalyst outlet Chcex becomes extremely high since the consumption of reductant is decreased when oxygen is no longer released. As a result, after oxygen adsorbed on the surface of a catalyst is consumed, a large amount of HC flows out (or slips) unused toward the downstream of the catalyst unit.

Meanwhile, an exhaust gas purification unit for an internal combustion engine is proposed, for example, as described in Japanese Patent Application Kokai Publication No. 2002-188430. In this exhaust gas purification unit, the feedback control for the supply amount of reductant is performed by using an air/fuel ratio sensor placed in the downstream of a catalyst unit carrying a NOx occlusion-reduction type catalyst. In the initial stage of regeneration control, the feedback control is stopped during a predetermined period until the output value from the air/fuel ratio sensor reaches a certain predetermined value, i.e. during a period until oxygen ($O_2$) storage effect converges. This prevents unnecessary supply of reductant caused by the oxygen occlusion function of a NOx occlusion material (NOx absorbent). At the same time, this prevents the deterioration of exhaust emissions caused by excessive supply of reductant and the useless consumption of reductant.

However, in this exhaust gas purification unit for an internal combustion engine, in the downstream of a catalyst unit, an air/fuel ratio is considered to exhibit a high apparent air/fuel ratio temporarily due to the release of oxygen caused by oxygen storage effect. Based on this consideration, the unit prevents the supply amount of reductant from exceeding the amount of reductant that should be supplied to the catalyst unit.

Accordingly, the consumption of reductant by released oxygen is not taken into consideration. As a result, there arises a problem that unpurified NOx cannot be prevented from flowing out toward the downstream of the catalyst unit in the initial stage of rich spike operation.

SUMMARY OF THE INVENTION

The present invention has been made to solve the above mentioned problems, and therefore an object of this invention is to provide a method of exhaust gas purification and an exhaust gas purification system using a NOx occlusion-reduction type catalyst for purifying NOx in exhaust gas, which can prevent both the outflow of unpurified NOx in the initial stage of regeneration and the outflow of unused reductant such as HC and CO in the later-stage of regeneration, by performing the generation control that supplies an appropriate amount of reductant into exhaust gas, taking an oxygen storage function into consideration during the regeneration control of the NOx occlusion-reduction type catalyst.

A method of exhaust gas purification for achieving the above-described object is a method of exhaust gas purification in a purification system for nitrogen oxides in exhaust gas, having a catalyst unit carrying a NOx occlusion-reduction type catalyst, which occludes NOx when an air/fuel ratio in exhaust gas is in a lean condition, and releases and reduces the occluded NOx when an air/fuel ratio in exhaust gas is in a rich condition, and performing the regeneration control to restore a capacity of the catalyst unit for occluding NOx when it is determined that an estimated amount of NOx occluded in the catalyst unit reaches a predetermined determination value, wherein said regeneration control comprising; performing a first rich control whose target air/fuel ratio is smaller than the theoretical air/fuel ratio by adding an amount of reductant meeting an amount of oxygen released from the catalyst unit in the initial stage of regeneration control to an amount of reductant supplied in order to reduce NOx released from the catalyst unit; determining completion of the oxygen release on the basis of an oxygen concentration in a downstream of the catalyst unit in said first rich control and performing a second rich control whose target air/fuel ratio is higher than that of the first rich control and closer to the theoretical air/fuel ratio when the oxygen release is determined to have been completed.

The above mentioned air/fuel ratio in exhaust gas does not necessarily represent the air/fuel ratio in a cylinder, but represents the ratio between an amount of air and an amount of fuel (including the amount combusted in the cylinder) that are supplied into the exhaust gas flowing into the catalyst unit carrying a NOx occlusion-reduction type catalyst.

In addition, it is preferable to set the target air/fuel ratio of the first rich control to 0.70 to 0.98 in terms of an excess air ratio λ, and the target air/fuel ratio of the second rich control to 0.98 to 1.02 in terms of an excess air ratio λ respectively. The relation between an air/fuel ratio (=amount of air/amount of fuel) and an excess air ratio λ is expressed as an excess air ratio=(air/fuel ratio/theoretical air/fuel ratio).

According to the above mentioned method of exhaust gas purification, the first rich control is performed with an increased amount of reductant required to consume oxygen released in the initial stage of regeneration, taking into consideration the oxygen storage function of the catalyst unit. This enables the air/fuel ratio adjacent to a NOx occlusion-reduction type catalyst to be maintained in a rich condition close to the theoretical air/fuel ratio, despite of oxygen release. In addition, unpurified NOx can be prevented from flowing out toward the downstream of the catalyst unit since the sufficient amount of reductant is supplied to reduce NOx released.

Furthermore, even after the completion of oxygen release, the second rich control with a reductant amount changed appropriately, enables the air/fuel ratio adjacent to a NOx occlusion-reduction type catalyst to be maintained in a rich condition close to the theoretical air/fuel ratio. Furthermore, unused HC and CO can be prevented from flowing out toward the downstream of a NOx occlusion-reduction type catalyst since unused reductant does not remain when released NOx are reduced.

Also, in the above described method of exhaust gas purification, a regeneration control can be performed with a relatively simple algorithm, by determining the amount of reductant meeting the oxygen amount released from the catalyst unit from the map data showing the relation between catalyst unit temperatures and oxygen occlusion amounts, and also by performing a feedback control so that the oxygen concentration at the inlet of the catalyst unit becomes the oxygen concentration of the target air/fuel ratio in the first and second rich controls.

The map data, showing the relation between catalyst unit temperatures and oxygen occlusion amounts, is obtained by an experiment in advance, input into a control unit and referred to during the regeneration control.

Furthermore, in the above described method of exhaust gas purification, in determining the completion of oxygen release, the oxygen release is determined to have been completed when an output value of an excess air ratio sensor that detects an oxygen concentration in the downstream of the catalyst unit is reversed. This excessive air ratio sensor has a large output change near the stoichiometric air/fuel ratio (the theoretical air/fuel ratio) and thus can determine the completion of oxygen release easily and accurately.

An $O_2$ sensor that has a characteristic of changing the output value rapidly at λ=1.0 between the rich side and the lean side, is used as the excess air ratio sensor. The $O_2$ sensor is calibrated to set λ=1.0 to zero point, so that the output value is reversed at λ=1.0 between positive and negative, thus enabling On/Off output.

In addition, in the above described method of exhaust gas purification, the control time of the second rich control can be determined by a relatively simple algorithm if the control time is calculated from the map data based on an engine load and an engine speed or the map data based on an engine load and a catalyst unit temperature.

These map data, are obtained by an experiment in advance, input into a control unit and referred to during the regeneration control.

Alternatively, in the above described method of exhaust gas purification, the control time of the second rich control is determined by a relatively simple algorithm if the control time is calculated from the amount of the NOx remaining in the catalyst unit and the amount of the HC detected in the downstream of the catalyst unit.

The amount of the remaining NOx is determined from a map, obtained from an experiment in advance and the like, and the exhaust gas temperature and regeneration time of the pervious regeneration. The amount of the HC is calculated from the value of the excess air ratio sensor placed at the catalyst outlet, using a map showing the relation between $O_2$ concentrations and the amount of the HC obtained from an experiment in advance. The control time of the second rich control is determined from these maps.

Also, an exhaust gas purification system for achieving the above-mentioned object is an exhaust gas purification system, having a catalyst unit carrying a NOx occlusion-reduction type catalyst, which occludes NOx when an air/fuel ratio in exhaust gas is in a lean condition, and releases and reduces the occluded NOx when an air/fuel ratio in exhaust gas is in a rich condition, and further comprising a regeneration control means for performing regeneration control in order to restore a capacity of the catalyst unit for occluding NOx when an estimated amount of NOx occluded into the catalyst unit reaches a predetermined determination value, and the generation control means comprising: a first control means for performing a first rich control whose target air/fuel ratio is smaller than the theoretical air/fuel ratio by adding the amount of reductant meeting the amount of oxygen released from the catalyst unit in the initial stage of regeneration control to an amount of ruductant supplied to reduce NOx released from the catalyst unit; a oxygen-release completion determination means for determining completion of the oxygen release from an oxygen concentration in a downstream of the catalyst unit during the first rich control; and a second rich control means for performing a second rich control whose target air/fuel ratio is higher than that of the first rich control and closer to the theoretical air/fuel ratio when the oxygen release is determined to have been completed.

In addition, in the above described exhaust gas purification system, the first rich control means has an additional reductant amount calculation means for calculating an amount of additional reductant that determines an amount of reductant meeting an amount of oxygen released from the catalyst unit based on map data showing a relation between catalyst unit temperatures and oxygen occlusion amounts, and also the first rich control and the second rich control are subjected to a feedback control so that each oxygen concentration at an inlet side of the catalyst unit becomes each oxygen concentration of the target air/fuel ratio respectively.

Furthermore, in the above described exhaust gas purification system, in determining completion of the oxygen release, the oxygen-release completion determination means determines that oxygen release has been completed when an output value of an excess air ratio sensor that detects an oxygen concentration in a downstream of the catalyst unit, changes substantially and is reversed at an point of an excess air ratio equal to 1.

Furthermore, in the above described exhaust gas purification system, the second rich control means calculates the control time of the second rich control, from the map data based on an engine load and an engine speed or from the map data based on an engine load and a catalyst unit temperature.

Alternatively, in the above described exhaust gas purification system, the second rich control means determines a control time of the second rich control from an amount of NOx remaining in the catalyst unit and an amount of HC detected in the downstream of the catalyst unit.

As described above, a method of exhaust gas purification and an exhaust gas purification system according to the present invention can exhibit the following effects.

In the regeneration control of the catalyst unit carrying a NOx occlusion-reduction type catalyst, since the first rich control is performed with the added amount of reductant required to consume oxygen released in the initial stage of regeneration, taking into consideration the oxygen storage function of the catalyst unit, the air/fuel ratio can be maintained in a rich condition and close to the theoretical air/fuel ratio despite of the oxygen released from the catalyst unit. Furthermore, since the amount of reductant consumed by the released oxygen is taken into consideration, the NOx released from the catalyst unit can be reduced with a sufficient amount of reductant.

In addition, after the completion of oxygen release, since the second rich control is performed with the amount of reductant appropriately changed, the air/fuel ratio adjacent to the NOx occlusion-reduction type catalyst can be maintained in a rich condition and close to the theoretical air/fuel ratio and the NOx released from the catalyst unit can be reduced with an appropriate amount of reductant even after oxygen release has been completed.

Therefore, the outflow of unpurified NOx in the initial stage of regeneration control can be decreased, thus improving the performance of the NOx purification. Furthermore, after the completion of oxygen release, i.e. in the later-stage of regeneration control, the outflow (or slip) of unused reductant such as HC and CO can be decreased. In addition, the appropriate regeneration control against the lowering of NOx occlusion capacity can be performed, with an appropriate combustion of unused HC and CO by the function of oxidation catalyst of the NOx occlusion-reduction type catalyst, and thus preventing the localized heating of the catalyst due to the heat of the reaction. Therefore, the heat deterioration of the catalyst can be decreased. Thus, the exhaust gas purification system of the present invention can cope with low activities due to the deterioration of the catalyst and exhibits a high performance and long life.

DETAILED DESCRIPTION OF THE INVENTION

A method of exhaust gas purification and an exhaust gas purification system of the present invention will hereinafter be described with reference to the drawings. The term "rich condition of exhaust gas" herein used does not represent rich combustion in the cylinder, but represents a condition where the ratio between the amount of air and the amount of fuel (including the amount combusted in the cylinder) that are supplied into exhaust gas flowing into a catalyst unit carrying a NOx occlusion-reduction type catalyst, is close to the theoretical air/fuel ratio, or in a rich condition where the amount of fuel is larger than that of the theoretical air/fuel ratio.

Figure 1:
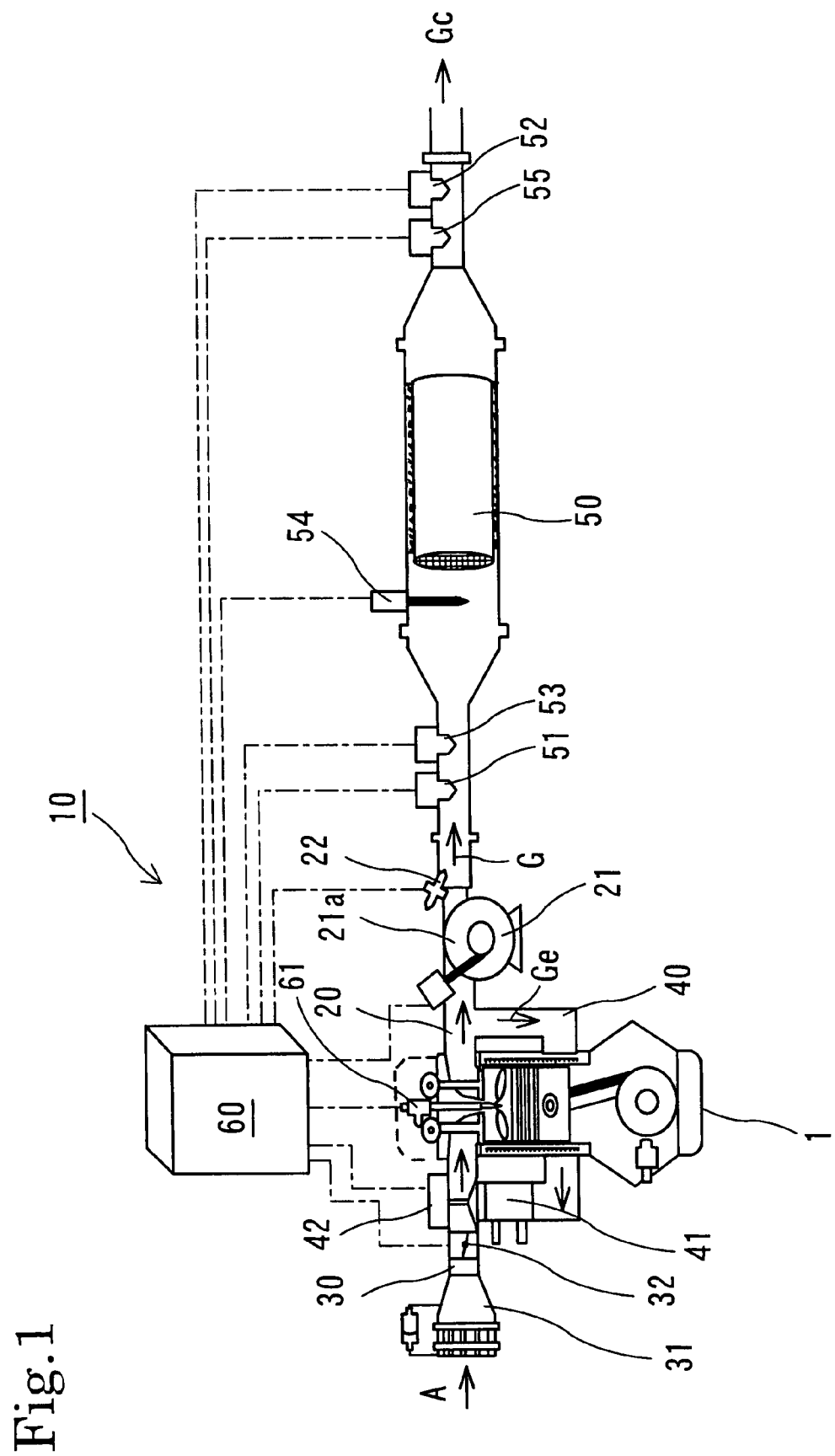
FIG. 1 is a drawing showing a configuration of an exhaust gas purification system of an embodiment in accordance with the present invention.

An exhaust gas purification system 10 shown in FIG. 1 is configured to place a catalyst unit 50 carrying a NOx occlusion-reduction type catalyst in an exhaust passage 20 of an engine (internal combustion) 1. The catalyst unit 50 is formed with a monolith catalyst. In the catalyst unit 50, a catalyst coat layer is formed on a support made of aluminum oxide, titanium oxide and the like. On the catalyst coat layer, there are carried a precious metal catalyst (catalyst metal) such as platinum (Pt) and palladium (Pd) and a NOx occlusion material (NOx occlusion substance) such as barium (Ba).

In the catalyst unit 50, NOx in exhaust gas are occluded by a NOx occlusion material when the exhaust gas has a high concentration of oxygen (lean air/fuel condition). Thereby, the NOx in exhaust gas are purified. When the oxygen concentration in exhaust gas is low or zero, the occluded NOx are released, and the released NOx are reduced by the catalytic function of a precious metal catalyst. Thereby, the outflow of NOx into the atmosphere is prevented.

In the upstream of the catalyst unit 50, an exhaust pipe fuel-admission valve 22 is provided. Fuel sent via a line (not shown) is supplied into exhaust gas as a reductant for NOx, through the exhaust pipe fuel-admission valve 22. Thereby, the air/fuel ratio in exhaust gas is made smaller than the theoretical air/fuel ratio, and the exhaust gas is made into a more fuel-rich condition.

Then, in the regeneration control of the catalyst unit 50, a feedback control is performed so that the oxygen concentration of exhaust gas flowing into the catalyst unit 50 becomes that of the target air/fuel ratio (or excess air ratio $\lambda$). The supply amount of reductant is controlled in the feedback control. For the purpose of the feedback control, a catalyst inlet $\lambda$ (excess air ratio) sensor 51 is provided on the inlet side of the catalyst unit 50. In addition, there is provided a catalyst outlet $\lambda$ sensor 52 that detects oxygen concentration in the downstream of the catalyst unit 50, in order to determine the completion of oxygen release in the initial stage of regeneration, based on the oxygen storage function of the NOx occlusion-reduction type catalyst of the catalyst unit 50. As the catalyst outlet $\lambda$ sensor 52, there is used an excess air ratio sensor that has a remarkably large change of output near the stoichiometric air/fuel ratio (the theoretical air/fuel ratio) and is able to determine the completion of oxygen release in a simple and accurate manner.

As the excess air ratio sensor 52, there is employed a sensor having a characteristic of reversing the output value between positive and negative at λ=1.0 when the sensor output conversion is calibrated to set λ=1.0 to zero point. The excess air ratio sensor has a characteristic of changing the output value rapidly between a rich side and a lean side at λ=1.0. The excess air ratio sensor outputs ON/OFF signals.

Furthermore, on the inlet side of the catalyst unit 50, there are disposed a catalyst inlet NOx sensor 53 and a catalyst inlet exhaust gas temperature sensor 54 that detects the temperature of the catalyst unit 50. In addition, on the outlet side of the catalyst unit 50, a catalyst outlet NOx sensor 55 is disposed. A turbine 21a of a turbocharger 21 is placed on the exhaust passage 20 in the upstream of the catalyst unit 50.

On the other hand, in an intake passage 30, there are provided a mass air flow (MAF) sensor 31, a compressor (not shown) of the turbocharger 21, an intercooler (not shown) and an intake throttle valve 32. Also there is provided an EGR passage 40 that connects the exhaust passage 20 in the upstream of the turbine 21a and the air-intake passage 30. In the EGR passage 40, an EGR cooler 41 and an EGR valve 42 are provided.

Furthermore, a control unit (ECU: Engine Control Unit) 60 is provided, which not only controls the overall operation of the engine 1, but also controls the regeneration of the NOx purification ability of the catalyst unit 50. Into this control unit 60, detected values are input from the catalyst inlet λ sensor 51, the catalyst outlet λ sensor 52, the catalyst inlet NOx sensor 53, the catalyst inlet exhaust gas temperature sensor 54, the catalyst outlet NOx sensor 55 and the like. Also, from the control unit 60, control signals are output, which control the EGR valve 42 of the engine 1, the fuel-injection valve 61 of a common-rail electronically controlled fuel injection apparatus for fuel injection, the intake throttle valve 32 and the like.

In the exhaust gas purification system 10, air A passes through the mass air flow sensor (MAF sensor) 31 of the intake passage 30 and the compressor (not shown) of the turbocharger 21, and enters into a cylinder with its amount adjusted by the intake throttle valve 32. Exhaust gas G, generated in the cylinder, drives the turbine 21a of the turbocharger 21 in the exhaust passage 20. Thereafter, the exhaust gas G passes through the catalyst unit 50, thus being changed to purified exhaust gas Gc, and flows out into the atmosphere through a silencer (not shown). In addition, a part of the exhaust gas G passes through the EGR cooler 41 in the exhaust passage 40 as the EGR gas Ge, and is recirculated into the intake passage 30 with its amount adjusted by the EGR valve 42.

Figure 2:
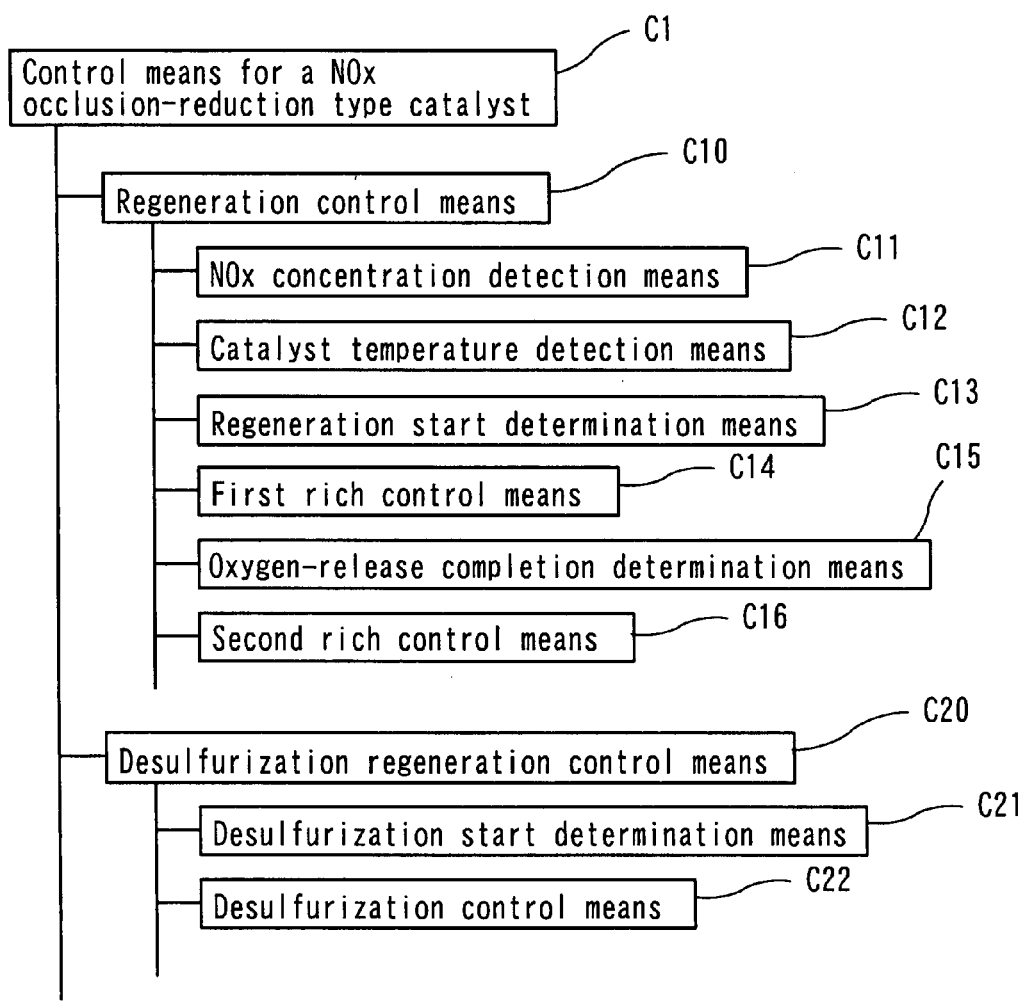
FIG. 2 is a block diagram showing a construction of the control means for an exhaust gas purification system of an embodiment in accordance with the present invention.

The control unit of the exhaust gas purification system 10 is built into the control unit 60 of the engine 1, and the control of the exhaust gas purification system 10 is performed along with the operation control of the engine 1. The control unit of the exhaust gas purification system 10 comprises a control means C1 for a NOx occlusion-reduction type catalyst, as shown in FIG. 2.

The control means C1 for a NOx occlusion-reduction type catalyst is a means for controlling the regeneration, desulfurization (sulfur purge) and the like for the catalyst unit 50 carrying a NOx occlusion-reduction type catalyst, and comprises a regeneration control means C10 and a desulfurization regeneration control means C20.

Furthermore, the regeneration control means C10 is a means for controlling the regeneration of the NOx occlusion capacity of the catalyst unit 50 when the estimated NOx occlusion amount, which has been estimated to be occluded into the catalyst unit 50, reaches a predetermined determination value. The regeneration control means C10 comprises a NOx concentration detection means C11, a catalyst temperature detection means C12, a regeneration start determination means C13, a first rich control means C14, an oxygen-release completion determination means C15 and a second rich control means C16.

The NOx concentration detection means C11 is a means for detecting a NOx concentration in exhaust gas and has a catalyst inlet NOx sensor 53 and a catalyst outlet NOx sensor 55. If an exhaust component concentration sensor, in which a NOx concentration sensor and an oxygen concentration (or an excess air ratio) sensor are combined, is used, an oxygen concentration (or excess air ratio) can be detected along with a NOx concentration.

The catalyst temperature detection means C12 is a means for detecting a catalyst unit temperature, based on the exhaust gas temperature Tg detected by the catalyst inlet exhaust gas temperature sensor 54. In the strict sense, the catalyst unit temperature differs from the exhaust gas temperature Tg and has to be corrected. However, the exhaust gas temperature Tg is regarded as the catalyst unit temperature in many cases for the ease of control and therefore the exhaust gas temperature (catalyst inlet gas temperature) Tg is regarded herein as the catalyst unit temperature. If a catalyst unit temperature sensor is provided and measures the catalyst unit temperature, the measured temperature is taken as the catalyst unit temperature.

In the regeneration start determination means C13, a catalyst inlet NOx concentration Cnoxin and a catalyst outlet NOx concentration Cnoxex are input from the NOx concentration detection means C11, and a fuel injection amount (fuel weight) Qg and an intake air amount (intake air weight) Ag are input based on the degree of control of the engine. The NOx occlusion amount per unit time Rnox1 is calculated from these values showing the condition of exhaust gas, using the expression Rnox1=(Qg+Ag)×(Cnoxin−Cnoxex). In this calculation, since the NOx occlusion amount is affected by a temperature to some extent, it is corrected to some extent, using the temperature as a function. The corrected amount is accumulated to determine the estimated NOx occlusion amount Rnox. The estimated NOx occlusion amount Rnox is compared to a determination value R0 for the start of regeneration control. The timing of the start of regeneration control is determined when the estimated NOx occlusion amount Rnox reaches the predetermined determination value R0 or more.

The determination value R0 for the start of regeneration control is calculated from map data for the start of regeneration control, predetermined from an engine speed Ne, which represents the operating condition of the engine, and engine load Q. The map data showing the determination value R0 for the start of regeneration control are based on data obtained from an experiment in advance and the like and are mapped based on the engine speed Ne and the engine load Q.

The first rich control means C14 comprises an additional reductant amount calculation means C141 for determining the amount of reductant meeting the oxygen released from the catalyst unit 50 (additional reductant amount) from map data showing the relation between catalyst unit temperatures and oxygen occlusion amounts. The first rich control means C14 is a means for performing a first rich control in a more fuel-rich condition by adding the additional reductant amount to the amount supplied to reduce the NOx released from the catalyst unit (standard reductant amount) in the initial stage of regeneration control to make the target air/fuel ratio smaller than the theoretical air/fuel ratio. The rich control means C14 performs a feedback control to make the inlet oxygen concentration of the catalyst unit 50 the oxygen concentration of the target air/fuel ratio, through a large amount EGR by intake throttling, fuel injection into an exhaust pipe, fuel injection control and the like. In the intake throttling, the intake throttle valve 22 and the EGR valve 42 are controlled. In the fuel injection control, fuel injection through the exhaust pipe fuel-admission valve 22 is performed in addition to post injection or main injection increase and the like.

As for the additional reductant amount, the amount of reductant meeting the oxygen amount released from the catalyst unit 50 is calculated in such a way that an oxygen occlusion amount is calculated from the catalyst unit temperature detected and with reference to the map data showing the relation between catalyst unit temperatures and oxygen occlusion amounts, a released oxygen amount is calculated from the calculated oxygen occlusion amount and then an additional reductant amount meeting the released oxygen amount is calculated.

On the other hand, the standard reductant amount, which does not consider the amount of oxygen released, is calculated from the map data for calculating the standard reductant amount, predetermined by an experiment in advance and the like, from the relation between an engine speed Ne and an engine load Q, which represent the operating condition of the engine. The map data is based on the relation between the engine speed Ne and the engine load Q, and sets the value of the amount of reductant that gives the minimum outflow of NOx toward the downstream of the catalyst unit when there is no oxygen released as the value of the standard reductant amount. The map data is set up based on the data obtained from an experiment in advance and the like.

The oxygen-release completion determination means C15 is a means for determining the completion of oxygen release in a first rich control, based on the oxygen concentration in the downstream of the catalyst unit 50. The oxygen-release completion determination means C15 determines that the oxygen release has been completed when the output value of the excess air ratio sensor 52, which detects the oxygen concentration in the downstream of the catalyst unit 50, is reversed.

The second rich control means C16 is a means for performing the second rich control whose target air/fuel ratio is higher than that of the first rich control and is closer to the theoretical air/fuel ratio, which is less fuel-rich than the first rich control. In the second rich control, a feedback control is performed so that the inlet oxygen concentration of the NOx occlusion-reduction type catalyst 50 becomes the oxygen concentration of the target air/fuel ratio. In the feedback control, a large amount EGR by intake throttling, as well as post injection or main injection increase are performed, without fuel injection into an exhaust pipe. In the second rich control, the target oxygen concentration is calculated based on the standard reductant amount that does not consider the amount of oxygen released.

In the second rich control means C16, the control time Tr of the second rich control is calculated from a first control-time map data based on an engine load and an engine speed, or from a second control-time map data based on an engine load and a catalyst unit temperature.

Figure 4:
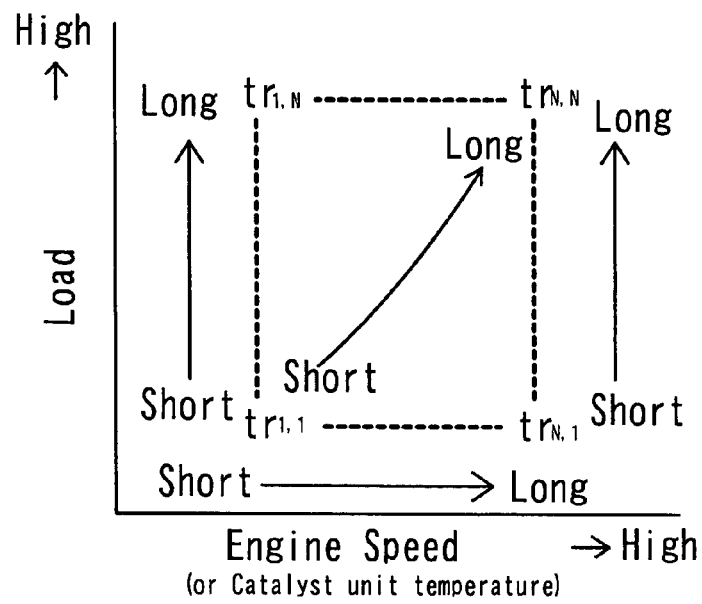
FIG. 4 is a schematic diagram showing a construction of the map data for the control time of a second rich control based on an engine load and an engine speed.

As shown in FIG. 4, in the first control-time map data, the control-times Tr of the second rich control are arrayed in a matrix and mapped, based on an engine load and an engine speed. The first control-time map data is made in such a way that the control time can be selected corresponding to the engine load and engine speed detected. The second control-time map data is made in the same manner as the first control-time map data.

Figure 5:
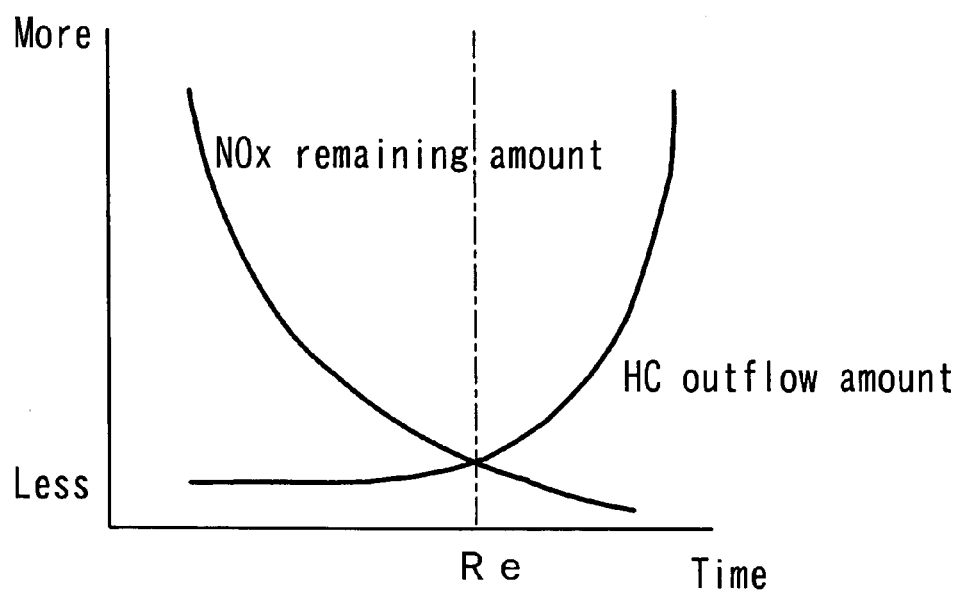
FIG. 5 is a schematic diagram showing the relation between remaining NOx amount and HC outflow amount.

In addition, as shown in FIG. 5, the optimum time (the intersecting point in FIG. 5) can be made to the termination time of the second rich control Re, since the NOx amount remaining in the catalyst unit 50 decreases, while the HC outflow amount toward the downstream of the catalyst unit 50 increases with the time passing of the second rich control. That is, the control time Tr of the second rich control can be determined from the NOx amount remaining in the catalyst unit 50 and the HC outflow amount detected in the downstream of the catalyst unit 50.

The desulfurization regeneration control means C20 comprises a desulfurization start determination means C21 and a desulfurization control means C22. The desulfurization start determination means C21 is a means for determining if sulfur purge control should be started, depending on if an amount of sulfur is accumulated to such an extent to decrease the NOx occlusion capacity, by calculating the amount of sulfur accumulated, and the like. The desulfurization regeneration control means C20 starts desulfurization when the accumulated amount of sulfur reaches a predetermined determination value or more. The desulfurization control means C22 is a means for performing desulfurization efficiently, while suppressing the emissions of carbon monoxide (CO) into the atmosphere. The desulfurization control means C22 controls the air/fuel ratio in exhaust gas by fuel injection into an exhaust pipe, or by post injection, and raises the temperature of the catalyst unit 50 by EGR control, intake throttling control or the like, to the temperature at which desulfurization can be performed.

Figure 3:
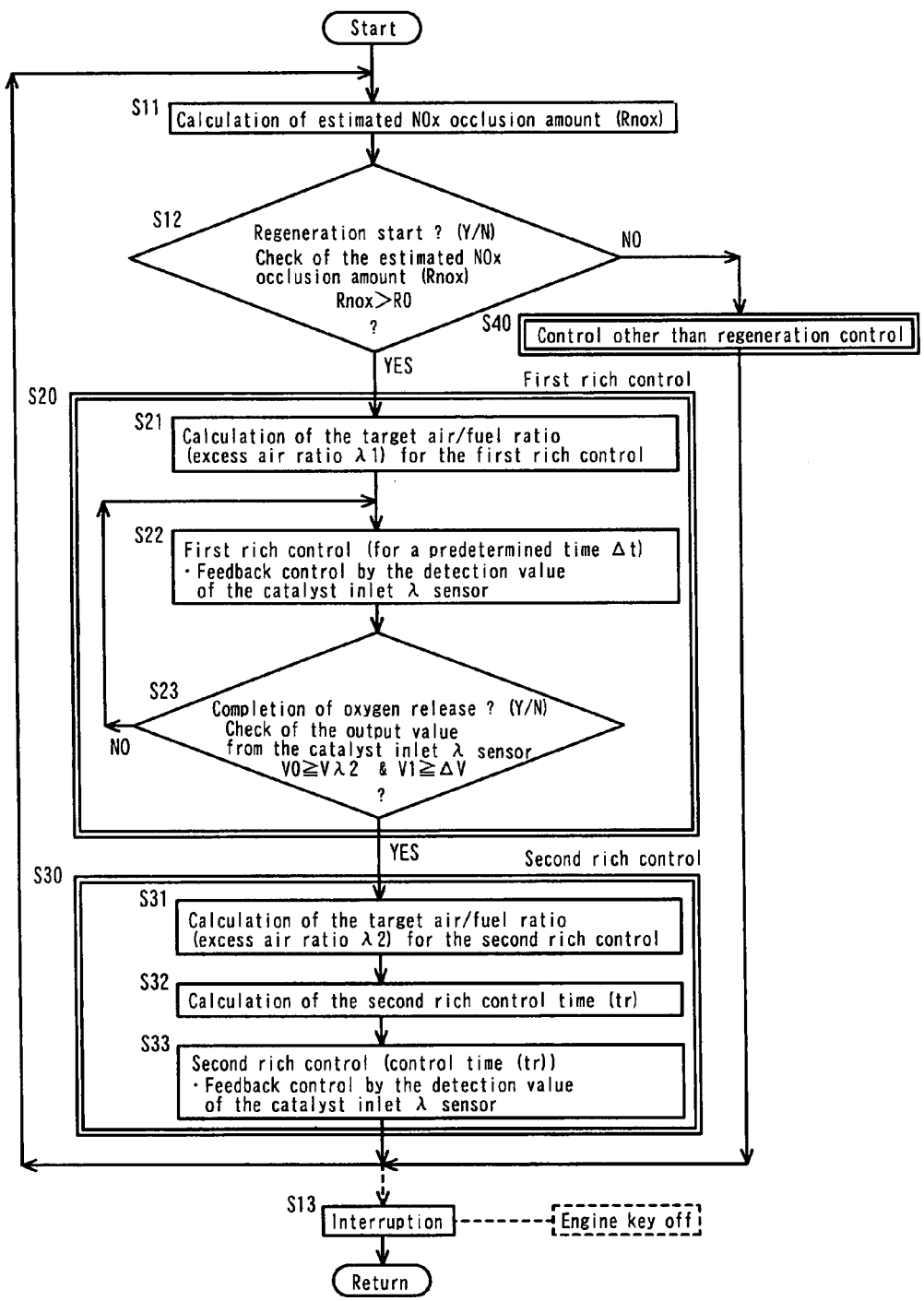
FIG. 3 is a block diagram showing an example of the control flow for regenerating a catalyst unit carrying a NOx occlusion-reduction type catalyst.

In this exhaust gas purification system 10, the regeneration control of the catalyst unit 50 is performed by the exhaust gas purification system control means C1 of the control unit for the exhaust gas purification system 10, which is built into the control unit 60 of the engine 1, following an exemplary flow shown in FIG. 3. The flow in FIG. 3 is shown to be performed in parallel with other control flows of the engine at the time of the operation of the engine 1.

Once the control flow shown in FIG. 3 is started, the regeneration start determination means C13 calculates an estimated NOx occlusion amount Rnox, from the catalyst inlet NOx concentration Cnoxin, the catalyst outlet NOx concentration Cnoxex, the fuel injection amount (fuel weight) Qg and the intake air amount (intake air weight) Ag at step S11. At the following step S12, the estimated NOx occlusion amount Rnox is compared to a determination value R0 for the start of regeneration control and the timing of the start of regeneration control is determined when the estimated NOx occlusion amount Rnox reaches the determination value R0 or more. The determination value R0 for the start of regeneration control is calculated from the map data for determining the start of regeneration control, predetermined from an engine speed Ne and an engine load Q, which represent the operating condition of the engine.

If the determination at step 12 determines that it is not the time to start regeneration control, controls other than regeneration control are performed at step S40. After passing through the routine of the controls other than the regeneration control, the process returns to step S11. In the controls other than regeneration control, the controls other than regeneration control such as desulfurization are performed if various conditions are satisfied. The process returns without performing the controls, if each condition is not satisfied.

If the determination at step S12 determines that it is the time to start regeneration control, the process proceeds to step S20 where a first rich control is performed by the first rich control means C14 of the regeneration control means C10.

In the first rich control, firstly, at step S21, the target air/fuel ratio of the first rich control (or the target excess air ratio of λ1) is calculated based on the amount that is obtained by adding the additional reductant amount meeting the amount of oxygen released from the catalyst unit 50 to the standard reductant amount that does not consider the amount of oxygen released from the catalyst unit 50 in the initial stage of regeneration control. This target air/fuel ratio is smaller than the theoretical air/fuel ratio.

Alternatively, the map data of the target air/fuel ratio (or the target excess air ratio of λ1) of the first rich control based on an engine load and an engine speed may be prepared in advance. In this case, the target air/fuel ratio of the first rich control (or the target excess air ratio of λ1) is determined from the engine load and engine speed detected, with reference to the map data. For the preparation of the map data, the engine load and engine rotational speed may be used as the base via the exhaust gas temperature instead of using the catalyst unit temperature, since the adsorption amount of oxygen is determined essentially by the catalyst unit temperature, and the exhaust gas temperature, which has a close relation to the catalyst unit temperature, is determined by the engine load and the engine speed.

Next, at step S22, feedback control is performed so that the inlet oxygen concentration of the catalyst unit 50 becomes the oxygen concentration of the target air/fuel ratio, through controls such as a large amount EGR by intake throttling, fuel injection into an exhaust pipe, as well as post injection or main injection increase. With this control, the air/fuel ratio of the exhaust gas before the catalyst is set to 0.70 to 0.98 (for example, 0.90) in terms of an excess air ratio (λ). At the same time, the exhaust gas temperature is set within a certain range (about 200 to 600 deg C., depending on the type of a catalyst) to restore the NOx occlusion capacity, i.e. the NOx purification ability, thus regenerating the NOx catalyst. The first rich control at step S22 is performed for a predetermined time period of Δt that is related to the interval of determining the completion of oxygen release, and then proceeds to step S23.

At the step S23, the completion of release of the oxygen that has been adsorbed and stored by the oxygen storage function of the catalyst unit 50, is determined by the oxygen-release completion determination means C15 during the first rich control. Oxygen release has been completed when it has been determined that the output value (voltage) Vλ2 from the excess air ratio sensor 52 changes substantially and is reversed at the value λ=1.

At step 23, if the oxygen release is determined to have not been completed, the process returns to step S22, and steps S22 and S23 are repeated until the oxygen release is determined to have been completed at step S23.

At step S23, if the oxygen release is determined to have been completed, the process proceeds to a second rich control at step S30. In the second rich control at step S30, the second rich control means C16 performs the second rich control whose target air/fuel ratio is higher than that of the first rich control and closer to the theoretical air/fuel ratio. First of all, at step S31, the target air/fuel ratio (target excess air ratio λ2) of the second rich control is determined based on the standard reductant amount that does not consider the amount of oxygen released.

Furthermore, at step S32, the control time Tr of the second rich control is calculated. The control time Tr is calculated from the first control-time map data based on an engine load and an engine speed, or from the second control-time map data based on an engine load and a catalyst unit temperature. Alternatively, the control time Tr of the second rich control is determined from the amount of NOx remaining in the catalyst unit 50 and the amount of HC detected in the downstream of the catalyst unit 50. The amount of NOx remaining in the catalyst unit 50 is determined from the map obtained from an experiment in advance and the like, as well as the exhaust gas temperature and regeneration time of the previous regeneration. As for the HC amount, the relation between $O_2$ concentrations and HC amounts is mapped based on a result of an experiment in advance. The HC amount is then calculated from the value of an excess air ratio sensor 52 at the catalyst outlet and the control time Tr of the second rich control is determined from the maps.

Next, at step S33, feedback control is performed so that the inlet oxygen concentration of the catalyst unit 50 becomes the oxygen concentration of the target air/fuel ratio (target excess air ratio λ2), through controls such as, a large amount EGR by intake throttling, fuel injection into an exhaust pipe, as well as post injection or main injection increase. With the controls, the air/fuel ratio of the exhaust gas before the catalyst inlet is set to 0.98 to 1.02 (for example, 1.0) in terms of an excess air ratio (λ). At the same time, the exhaust gas temperature is set within a certain range (about 200 to 600 deg C., depending on the type of a catalyst) to restore the NOx occlusion capacity, i.e. the NOx purification ability, regenerating the NOx catalyst. The second rich control at step S33 is performed for the control-time Tr of the second rich control that has been calculated at step S32 and then terminates.

The regeneration control is performed in the first rich control at step S20 and the second rich control at step S30, and after the second rich control terminates, the process returns to step S11.

The control flow shown in FIG. 3 is repeated until the engine stops. If the engine is turned off during the control, an interruption of step S13 occurs. After the termination processing (not shown) required is performed at the step where the interruption occurs, the process returns. Then the control flow is terminated at the same time of the termination of the main control.

According to this control flow, in regeneration control for an exhaust gas NOx purification system, the first rich control whose target air/fuel ratio (excess air ratio λ1) is smaller than the theoretical air/fuel ratio, is performed by adding the amount of reductant meeting the amount of oxygen released from the catalyst unit 50 in the initial stage of the regeneration control, to the amount of reductant supplied to reduce NOx released from the catalyst unit 50. In the first rich control, the completion of oxygen release is determined based on the oxygen concentration in the downstream of the catalyst unit 50, and when the oxygen release is determined to have been completed, the second rich control whose target air/fuel ratio (excess air ratio λ2) is larger than the first rich control and closer to the theoretical air/fuel ratio, is performed. The catalyst unit 50 is thus regenerated.

Figure 6:
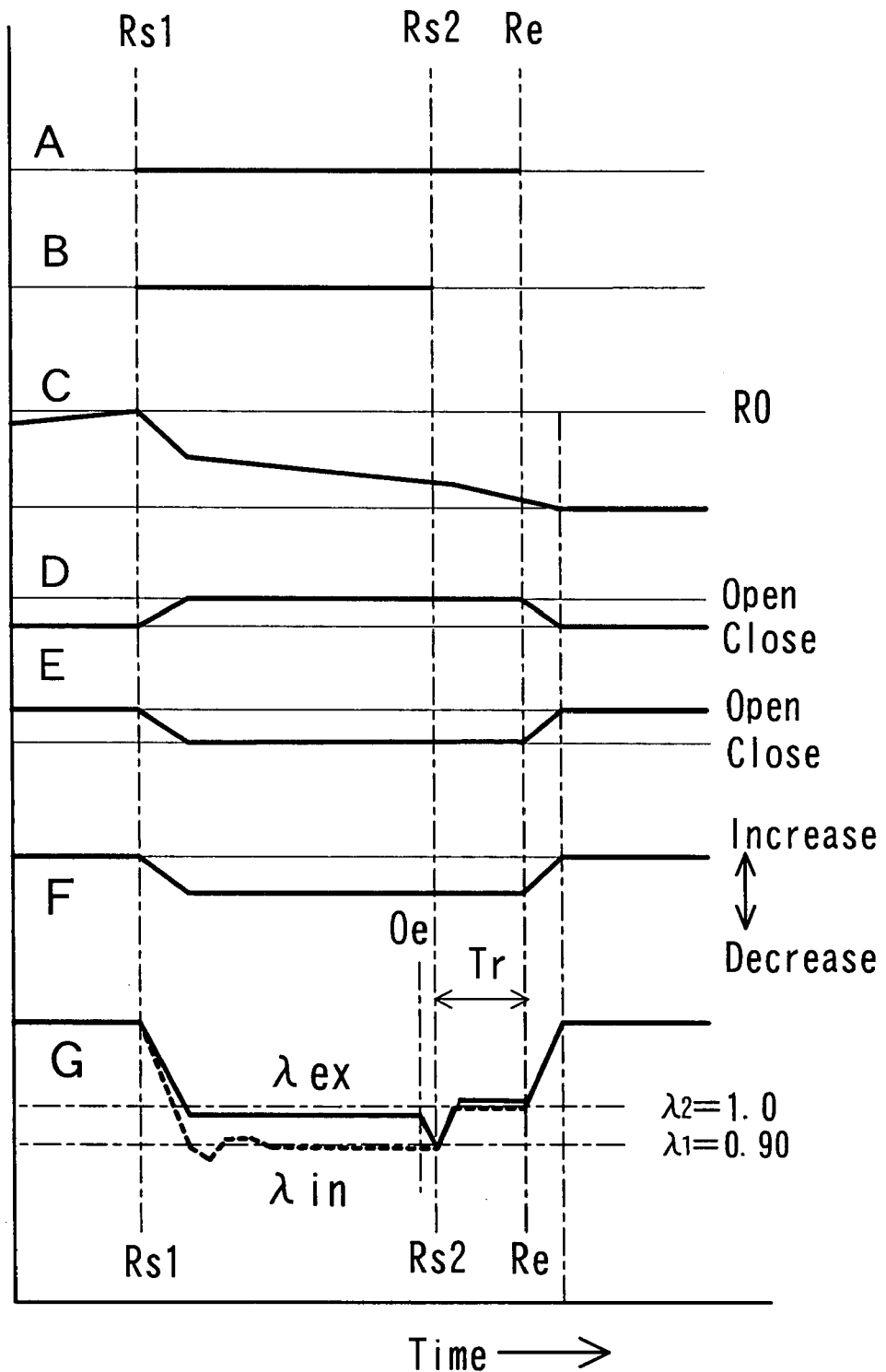
FIG. 6 is a schematic diagram showing the temporal changes in fuel injection control, control of injection into an exhaust pipe, an estimated NOx occlusion amount, degree of opening of an EGR valve, degree of throttle opening of an intake valve, an intake air amount, an excess air ratio at a catalyst inlet and an excess air ratio at a catalyst outlet in the flow control shown in FIG. 3.
Figure 7:
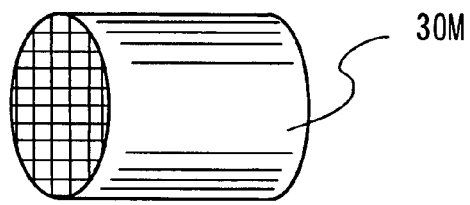
FIG. 7 is a drawing showing a monolith-honeycomb.
Figure 8:
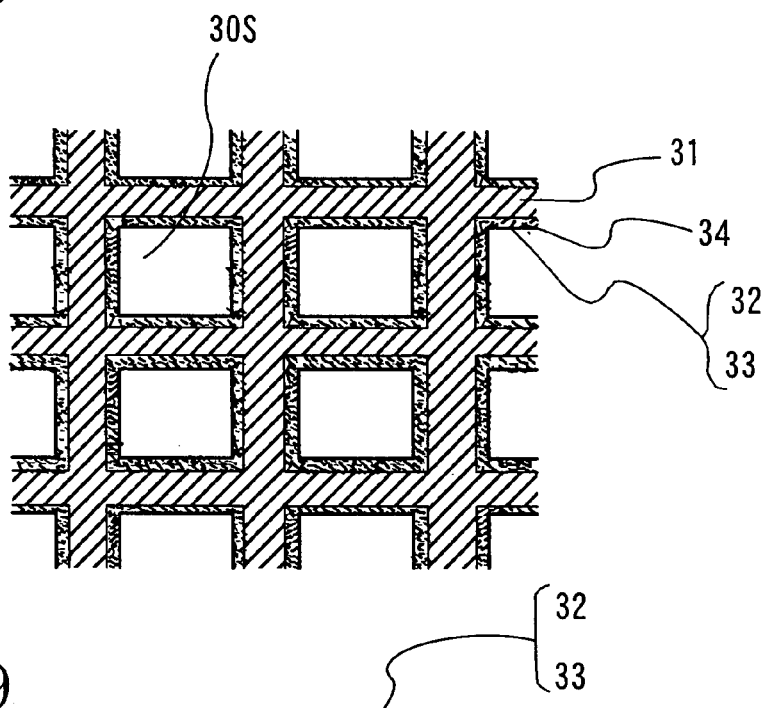
FIG. 8 is an enlarged view of a part of a monolith-honeycomb.
Figure 9:
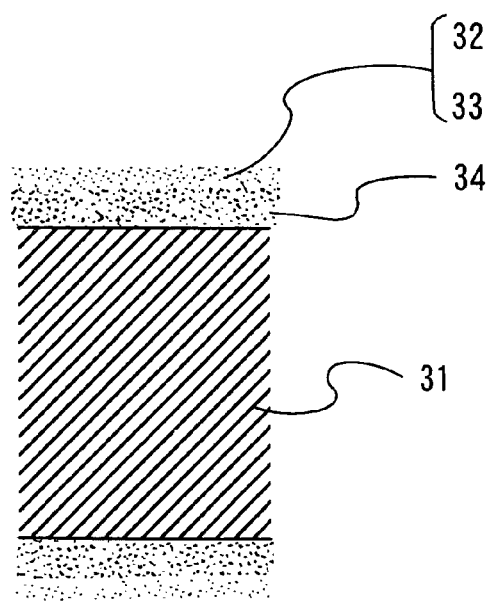
FIG. 9 is an enlarged view of the cell wall of a monolith-honeycomb.
Figure 10:
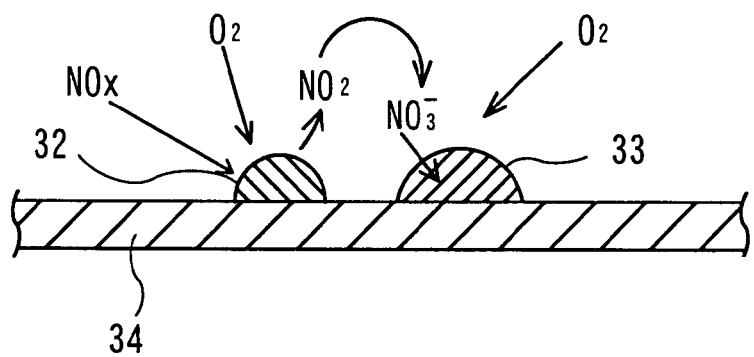
FIG. 10 is a schematic drawing showing a configuration of a catalyst unit and a purification mechanism during a lean control condition.
Figure 11:
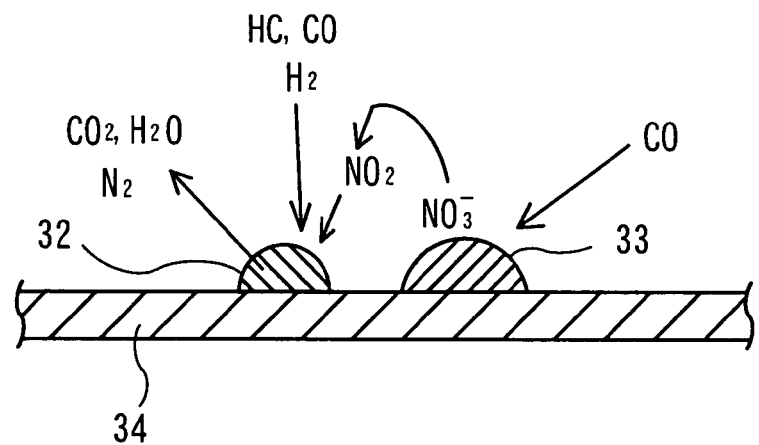
FIG. 11 is a schematic drawing showing a configuration of a catalyst unit and a purification mechanism during a rich control condition.
Figure 12:
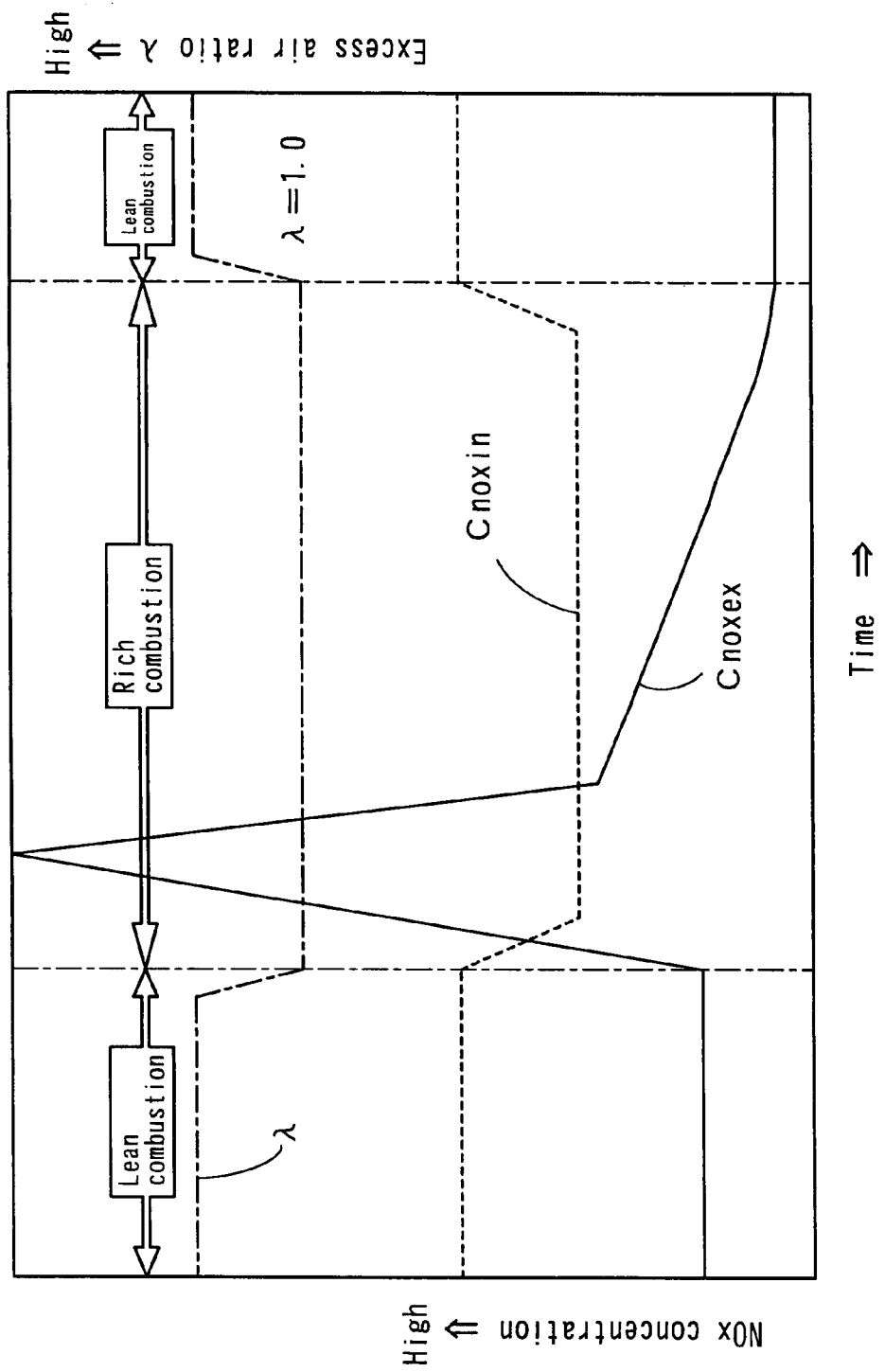
FIG. 12 is a schematic diagram showing the relations in a very low temperature.
Figure 13:
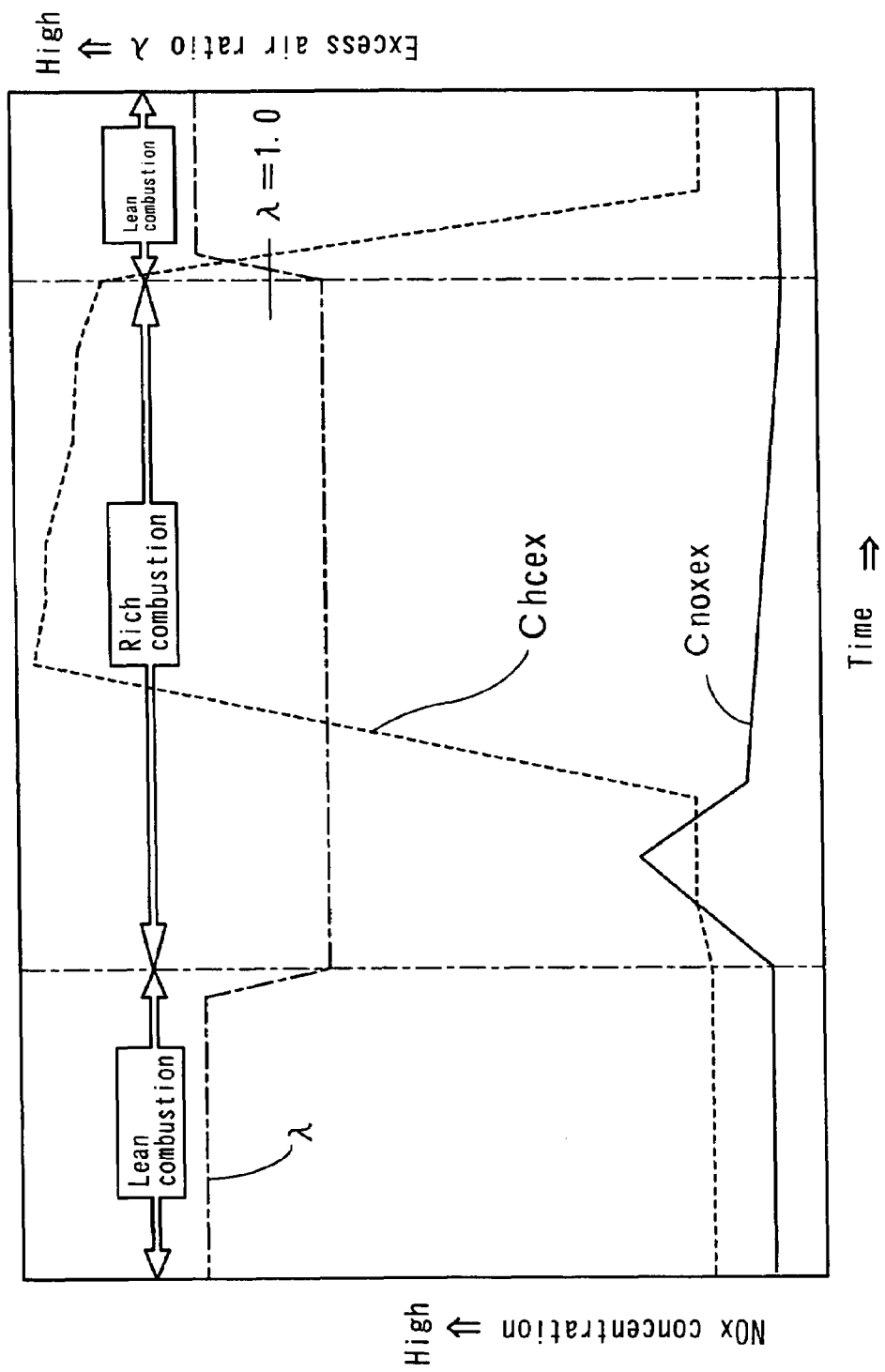
FIG. 13 is a diagram showing the relation between catalyst unit temperatures and purification rates.

FIG. 6 is a schematic diagram showing an example of the temporal changes in the fuel injection control A such as post injection or main injection increase, control for fuel injection into an exhaust pipe B, an estimated NOx occlusion amount (Rnox) C, degree of opening of a EGR valve D, degree of the throttle opening of an intake valve E, an intake air amount F, a catalyst inlet excess air ratio λ in, and a catalyst outlet excess air ratio λ ex, according to the control flow of FIG. 3.

In FIG. 6, regeneration control starts at the time Rs1, when the estimated NOx occlusion amount (Rnox) C exceeds a threshold value R0. In the first rich control, fuel injection through the exhaust pipe fuel-admission valve 22 is performed in addition to fuel injection control such as post injection, setting the target excess air ratio λ1 to 0.70 to 0.98 (for example, 0.90). At the same time, the degree of opening of the EGR valve D is made open and the degree of the throttle opening of the intake valve E is made close to decrease the intake air amount F. Feedback control is performed so that the catalyst inlet excess air ratio λ in becomes the target excess air ratio λ1. The catalyst inlet excess air ratio λ in becomes the target excess air ratio λ1 after an overshoot, and the first rich control continues until the completion of oxygen release Oe. This first rich control causes the estimated NOx occlusion amount (Rnox) C to be decreased.

Then, at the completion of oxygen release Oe, the catalyst outlet excess air ratio λ ex starts to decrease rapidly. At the time Rs2 when this decrease is detected, the first rich control is terminated and the second rich control is started. In the second rich control, setting the target excess air ratio λ2 to 0.98 to 1.02 (for example, 1.0), fuel injection control such as post injection, continues, but the fuel injection into an exhaust pipe from an exhaust pipe fuel-admission valve 22 is discontinued. Then, feedback control is performed so that the catalyst inlet excess air ratio λ in becomes the target excess air ratio λ2. After the catalyst inlet excess air ratio λ in becomes the target excess air ratio λ2 and is maintained for a predetermined time period of Tr, at the time Re the fuel injection control such as post injection, is discontinued. At the same time, the intake air amount F is recovered by making the degree of opening of an EGR valve D close, and the degree of the throttle opening of an intake valve E open. Then the second rich control terminates. With the first and second rich controls, the estimated NOx occlusion amount (Rnox) C becomes approximately zero, that is, the NOx occlusion capacity is restored and the regeneration control is completed.

Furthermore, according to the exhaust gas purification system 10 of the above construction, the air/fuel ratio in a catalyst unit 50 is maintained in a rich condition near the theoretical air/fuel ratio, despite of the oxygen released from the catalyst unit 50, during the regeneration control to restore the NOx occlusion capacity of the catalyst unit 50 carrying a NOx occlusion-reduction type catalyst. This is because a first rich control is performed with the additional amount of reductant required to consume the oxygen released in the initial stage of regeneration, taking into consideration the oxygen storage function of the NOx occlusion-reduction type catalyst 50. In addition, since the consumption of the reductant by the oxygen released is taken into consideration, the NOx released from the catalyst unit 50 can be reduced with a sufficient amount of reductant.

In addition, after the oxygen release, since a second rich control is performed with the amount of reductant changed appropriately, the air/fuel ratio adjacent to the NOx occlusion-reduction type catalyst of the catalyst unit 50 can be maintained to be close to the theoretical air/fuel ratio even after the completion of the oxygen release and the NOx released from the catalyst unit 50 can be reduced with an appropriate amount of reductant.

Accordingly, the outflow of unpurified NOx in the initial stage of regeneration control can be decreased, improving the NOx purification performance, and furthermore, the outflow (slip) of HC and CO, after the completion of oxygen release, can be decreased.

INDUSTRIAL APPLICABILITY

A method of exhaust gas purification and an exhaust gas purification system according to the present invention have excellent effects as described above, and can be very effectively utilized as the method and system for purifying the exhaust gas from internal combustion engines on automobiles, as well as for purifying exhaust gas from various industrial machines and stationary internal combustion engines, factory emissions, power plant emissions and the like.

What is claimed is:

1. In a regeneration control of purification system for nitrogen oxides in exhaust gas, having a catalyst unit carrying a nitrogen oxides occlusion-reduction type catalyst, which occludes nitrogen oxides when an air/fuel ratio in exhaust gas is in a lean condition, and releases and reduces the occluded nitrogen oxides when an air/fuel ratio in exhaust gas is in a rich condition, and performing the regeneration control to restore a capacity of the catalyst unit for occluding nitrogen oxides when it is determined that an estimated amount of nitrogen oxides occluded in the catalyst unit reaches a predetermined determination value:

a method of exhaust gas purification comprising:
performing a first rich control by adding an amount of reductant meeting an amount of oxygen released from the catalyst unit in an initial stage of the regeneration control to an amount of reductant supplied in order to reduce nitrogen oxides released from the catalyst unit so that an air/fuel ratio in the exhaust gas becomes a first target air/fuel ratio determined on the basis of the added amount of the reductant;

determining completion of the oxygen release on the basis of an oxygen concentration in a downstream of the catalyst unit in said first rich control; and performing a second rich control such that an amount of reductant supplied in order to reduce the nitrogen oxides released from a nitrogen oxides occlusion-reduction type catalyst is calculated and an air/fuel ratio in the exhaust gas becomes a second target air/fuel ratio determined on the basis of the calculated amount of the reductant, when the oxygen release is determined to have been completed.

2. An exhaust gas purification system, having a catalyst unit carrying a nitrogen oxides occlusion-reduction type catalyst, which occludes nitrogen oxides when an air/fuel ratio in exhaust gas is in a lean condition, and releases and reduces the occluded nitrogen oxides when an air/fuel ratio of exhaust gas is in a rich condition, and further comprising a regeneration control means for performing a regeneration control to restore a capacity of the catalyst unit for occluding nitrogen oxides when an estimated amount of nitrogen oxides occluded into the catalyst unit reaches a predetermined determination value, and the regeneration control means comprising:

a first rich control means for performing a first rich control by adding an amount of reductant meeting an amount of oxygen released from the catalyst unit in an initial stage of the regeneration control to an amount of reductant supplied in order to reduce nitrogen oxides released from the catalyst unit so that an air/fuel ratio in the exhaust gas becomes a first target air/fuel ratio determined on the basis of the added amount of the reductant;

an oxygen-release completion determination means for determining completion of the oxygen release from an oxygen concentration in a downstream of the catalyst unit in the first rich control; and a second rich control means for performing a second rich control such that an amount of reductant supplied in order to reduce nitrogen oxides released from the nitrogen oxides occlusion-reduction type catalyst is calculated and an air/fuel ratio in the exhaust gas becomes a second target air/fuel ratio determined on the basis of the calculated amount of the reductant, when the oxygen release is determined to have been completed.

3. An exhaust gas purification system according to claim 2, wherein the first rich control means has an additional reductant amount calculation means for calculating an amount of additional reductant that determines an amount of reductant meeting an amount of oxygen released from the catalyst unit based on map data showing a relation between catalyst unit temperatures and oxygen occlusion amounts, and also wherein the first rich control and the second rich control are subject to feedback control so that each oxygen concentration at an inlet side of the catalyst unit becomes each oxygen concentration of the target air/fuel ratio respectively.

4. An exhaust gas purification system according to claim 2 or 3, wherein, in determining completion of oxygen release, the oxygen-release completion determination means determines that oxygen release has been completed when an output value of an excess air ratio sensor that detects an oxygen concentration in a downstream of the catalyst unit, changes substantially and is reversed at point of an excess air ratio equal to 1.

5. An exhaust gas purification system according to claim 2 or 3, wherein the second rich control means calculates a control time of the second rich control from map data based on an engine load and an engine speed, or from map data based on an engine load and a catalyst unit temperature.

6. An exhaust gas purification system according to claim 2 or 3, wherein the second rich control means determines a control time of the second rich control from an amount of nitrogen oxides remaining in the catalyst unit and an amount of carbon hydrate detected in a downstream of the catalyst unit.

7. A method according to claim 2, wherein performing the first rich control includes calculating an amount of additional reductant that determines an amount of reductant meeting an amount of oxygen released from the catalyst unit based on map data showing a relation between catalyst unit temperatures and oxygen occlusion amounts, and also wherein performing the first rich control and the second rich control including relying on feedback control so that each oxygen concentration at an inlet side of the catalyst unit becomes each oxygen concentration of the target air/fuel ratio respectively.

8. A method to claim 1 or 7, wherein determining completion of oxygen release is completed when an oxygen concentration in a downstream of the catalyst unit changes substantially and is reversed at a point of an excess air ratio equal to 1.

9. An exhaust gas purification system according to claim 1 or 7, further comprising calculating a control time of the second rich control from map data based on an engine load and an engine speed, or from map data based on an engine load and a catalyst unit temperature.

10. A method according to claim 1 or 7, further comprising calculating a control time of the second rich control from an amount of nitrogen oxides remaining in the catalyst unit and an amount of carbon hydrate detected in a downstream of the catalyst unit.

* * * * *